Patented Apr. 9, 1929.

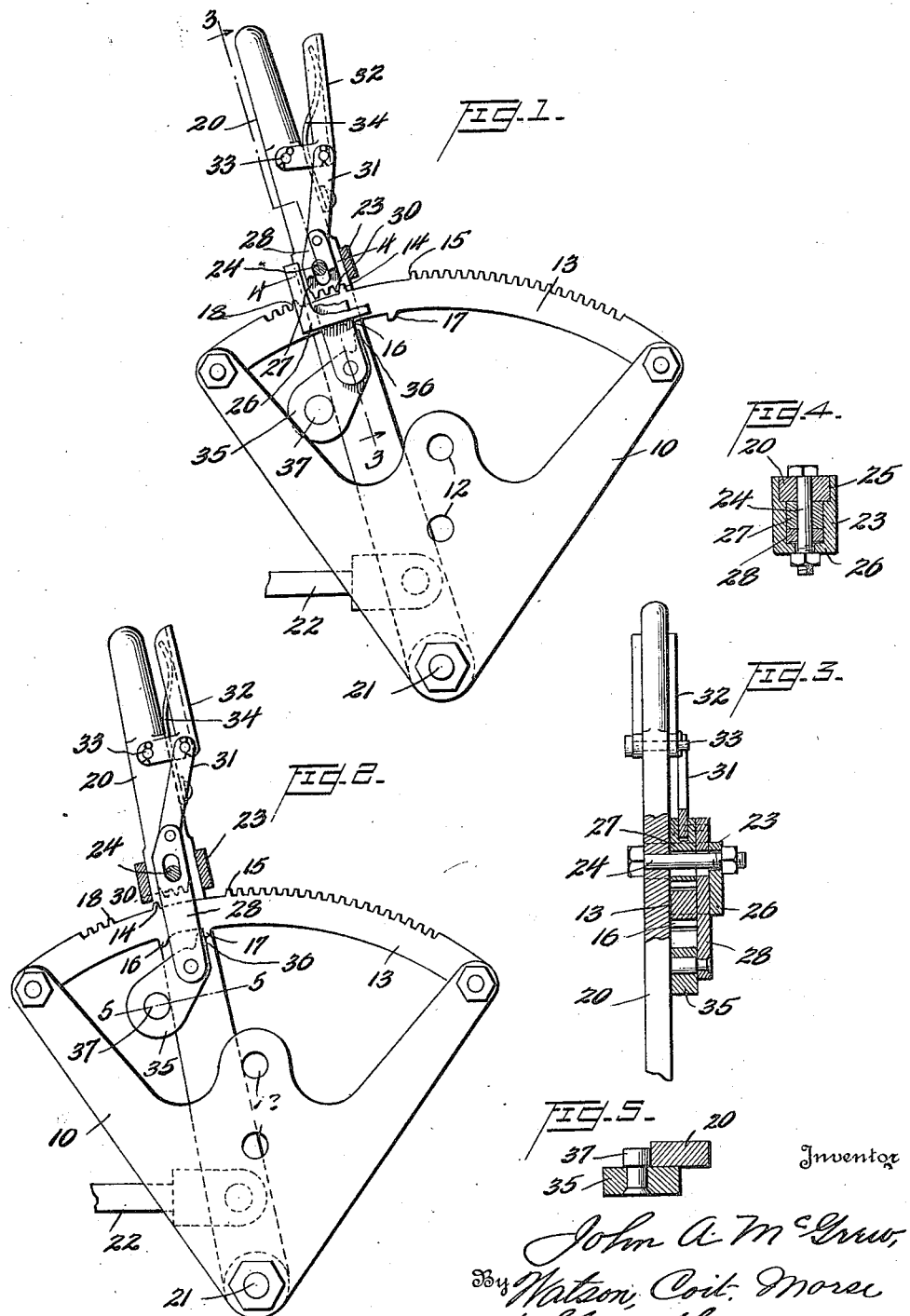

1,708,145

UNITED STATES PATENT OFFICE.

JOHN A. McGREW, OF ALBANY, NEW YORK.

MECHANISM FOR OPERATING VALVES AND THE LIKE.

Application filed March 12, 1927. Serial No. 174,827.

The present invention relates to mechanisms for the manual operation of valves and the like, and particularly to mechanisms of this class designed and constructed for the opening and closing of steam valves from a distant point, as for instance the manipulation of locomotive throttle valves.

It is well known to locomotive engineers that great caution should be exercised in the initial opening of the throttle when the locomotive is at a standstill, particularly when a heavy train is coupled thereto. Too sudden opening of the throttle valve under such conditions results in slipping of the driving wheels on the tracks which is injurious to both wheels and tracks. The same undesirable slipping may occur even when the locomotive or train is moving slowly and the throttle is suddenly opened.

It is the object of the present invention to provide a mechanism for the manual operation of valves, particularly locomotive throttle valves which includes means whereby a continuous unbroken movement of the valve operating member in its valve opening direction is rendered impossible. In other words, mechanism is provided which compels the valve operator to open the valve in steps instead of one continuous unbroken valve opening motion. The invention may have many uses, not being limited to locomotive valve opening devices, and may have widely varying embodiments, since various changes may be made therein in adapting it to various purposes. That form which is shown by way of example is well adapted for use as a locomotive throttle operating device, but one skilled in the art will readily perceive it is applicable for use for operating fluid valves of various kinds and the like in connection with other types of machines.

In the drawings:

Figure 1 is a side elevation of a locomotive throttle lever and segment embodying the invention, partly broken away;

Figure 2 is a similar view showing the operative parts in different positions;

Figure 3 is a section on line 3—3 of Fig. 1;

Figure 4 is a section on line 4—4 of Fig. 1; and

Figure 5 is a section on line 5—5 of Fig. 2.

A base or support is indicated at 10 and this base may have any form or character desired, depending upon the position in which the throttle operating lever is to be placed and the structure to which it is to be secured. In the present instance it is provided with cylindrical apertures 12 through which bolts may be passed by means of which it may be secured to a plate or side wall of a locomotive cab. To this base are bolted the ends of a segment 13. This segment carries abutments 14 and 15 upon its upper edge. In addition to abutments 14 and 15 the upper edge of the segment carries teeth in the usual manner, these teeth extending from abutment 15 to the right-hand end of the segment and also from the left-hand end for a short distance toward the abutment 14 leaving, however, a space between the final tooth 18 and the abutment 14, in which the teeth are omitted, for reasons hereinafter to be explained. The throttle lever is indicated at 20, this lever being pivotally supported at 21 on base 10 and its upper end being shaped to form a handle. A link 22 is pivotally connected to lever 20 intermediate its ends, the opposite end of this link being operatively connected to a throttle valve. A yoke or collar 23, clearly shown in section in Fig. 4, is secured to the lever, just above the segment 13, by a bolt 24, this collar being notched at 25 to receive the corners of the lever. The collar extends outwardly over the segment and has a downwardly extending portion 26, the edges of which fit closely against the side of the segment and therefore constitute guiding surfaces, preventing the lever from being drawn laterally away from the segment.

Within the rectangular opening defined by the inner walls of the collar are positioned a dog 27 and a link 28, these members being slidable longitudinally of the lever and being guided in their sliding movements by the collar. Both dog and link are longitudinally slotted to receive the bolt 24. The dog has teeth 30 to engage with the teeth of the segment and its upper end is connected by a link 31 to a bell crank lifting lever 32 pivoted at 33 to the throttle lever. A spring 34 normally urges lever 32 to the position in which it is shown in Fig. 1, in which position the dog is in its lowermost position, as shown. The link 28 is pivoted at its upper end to the dog 27 and pivotally supports at its lower end a gravity actuated pawl 35. This pawl has an upwardly extending portion 36 for engagement with the abutments 16 and 17 when raised by movement of lever 32, and has, below its pivotal axis, a stop 37 which normally rests against the adjacent edge surface of the throttle lever and limits its rotatory movement in a counterclockwise direction under the influence of gravity, although not limiting movement in the opposite direction. The dog 27 and the pawl 35 are hereinafter designated adjustable stops. It is apparent that the right-hand tooth 30 of the dog is, with the dog in the position in which it is shown in Fig. 1, in position to strike abutment 14 if it is attempted to rock the throttle lever toward the right, and the upper extremity 36 of stop 35 is positioned to strike abutments 16 and 17 when raised, as shown in Fig. 2.

With the throttle lever moved to its extreme left-hand position, the throttle is closed. When it is desired to open the throttle, the operator presses the long arm of lever 32 toward the handle portion of the throttle lever thus raising the dog out of engagement with the extreme left-hand series of teeth. The dog being thus disengaged, the engineer may rock the throttle lever toward the right, but only until portion 36 of stop 35 contacts with abutment 16. Motion of the lever is thus abruptly terminated and, in order to move the throttle lever further toward the right, lever 32 must be released, thus lowering stop 35 to clear abutment 16, but at the same time lowering dog 27 into position to strike abutment 14. However, in this lowered position the teeth 30 of dog 27 do not engage the teeth of the segment, and hence the lever may be rocked slightly further to the right or until it assumes the position shown in Fig. 1, the right-hand tooth 30 striking abutment 14. This slight further movement, however, causes the projection 36 of stop 35 to clear abutment 16 so that upon the lifting of both stops through the actuation of lever 32, the upper stop will clear abutment 14 and the throttle lever 20 may be further rocked to the right, the lower stop 35 having already cleared abutment 16. This motion is uninterrupted until stop 35 contacts with the next abutment 17 when the stops must be adjusted as before, being simultaneously lowered so that the lower stop 35 clears the lower abutment 17 and then simultaneously raised so that the upper stop 27 clears abutment 15. There being no further abutments on the lower surface of the segment, the lever may be given a continuous further rocking movement toward the right until it reaches the limit of its travel.

It will be seen therefore that by means of the arrangement of stops and abutments just described, the rocking movement of the throttle lever in the throttle opening direction is twice brought to a halt or full stop in moving from one extreme position to another. This effectively prevents the engineer from suddenly opening the throttle wide even though he be disposed to do so. The momentary halting of the movement of the throttle lever thereby prevents sudden introduction of full steam pressure to the engine cylinders and obviates danger of spinning of the wheels. Obviously upon the return movement of the lever, i. e. to close the throttle, the lower stop 35 will be in its raised position, but it is so designed that its upper portion 36 merely rides over abutments 16 and 17 without interrupting the continuous movement of the lever so that the throttle may be closed swiftly and without a step by step movement.

It is quite apparent that additional abutments such as 16 and 17 may be provided if desired so that the movement of the throttle from closed to open position be further interrupted. Any desired step by step movement may be brought about by simple modifications of the mechanism disclosed. It is further apparent that the invention is by no means limited to the throttle lever and segment which has been disclosed by way of example, it not being necessary that the movable member 20 be pivoted or that the stationary member 13 be in the form of a segment. Other alterations in the structure may be made to suit conditions, the invention not being limited in the design or arrangement of its component elements to that form disclosed.

Having thus described the invention, what is claimed as new and desired to be secured by Letters Patent is:

1. Mechanism for the manual operation of valves and the like comprising in combination, a member mounted to move in a fixed path, a stationary member positioned adjacent the path of travel of the movable member and having two abutments positioned adjacent each other, two stops movably mounted on the movable member for cooperation respectively with the said abutments, impact of either stop on its associated abutment halting the movement of the movable member, and means for actuating said stops into and out of abutment striking position, the arrangement of abutments and stops being such that movement of one stop to clear the first abutment brings the second stop into position to strike the second abutment, thereby rendering it necessary to actuate said stops successively in abutment clearing direction in moving said movable member in one direction, thus preventing continuous unbroken movement of such movable member in that direction, one of said abutments and its associated stop constituting means for locking the movable member in a selected position along its path until released by said actuating means, release of said actuating means permitting continuous return movement of the member.

2. Mechanism for the manual operation of valves and the like comprising in combination, a throttle lever pivoted to rock about a fixed axis, a stationary segment positioned adjacent the path of movement of the throttle lever and having an abutment upon its upper edge and an abutment on its lower edge, two stops movably mounted on the throttle lever for cooperation respectively with said abutments, impact of either stop on its associated abutment halting the movement of the movable member, and manually operable means for actuating said stops into and out of abutment striking position, the arrangement of abutments and stops being such that movement of one stop to clear the first abutment brings the second stop into position to strike the second abutment, thus rendering it necessary to actuate said stops successively in abutment clearing direction in moving said throttle lever in one direction, thus preventing continuous unbroken movement of the throttle member in that direction, one of said abutments and its associated stop constituting means for locking the lever in a selected position until released by said actuating means, release of said actuating means permitting continuous return movement of the lever.

3. Mechanism for the manual operation of valves and the like comprising in combination, a member mounted for movement in a fixed path, a stationary member positioned adjacent the path of travel and having a plurality of positive abutments therealong, a one-way abutment also mounted on said stationary member, spaced from said positive abutments, and opposite a space therebetween, a positive stop movably mounted on said movable member constituting with said positive abutments means for locking said movable member in selected positions along its path, a one-way stop mounted on said movable member for movement into engagement with said one-way abutment, and a connection between said stops whereby release of one causes engagement of the other preventing continuous movement of said movable member in one direction, continuous movement in the other direction being permitted by said connection carrying the positive stop into the spaces between the positive abutments as the one-way stop rides over the one-way abutment, when said locking means is released.

4. Mechanism for the manual operation of valves and the like comprising in combination, a member mounted for movement in a fixed path, a stationary member positioned adjacent the path of travel and having a plurality of aligned positive abutments and a plurality of aligned one-way abutments spaced therefrom in alternate spaced relation whereby each space has an abutment opposite thereto, a positive stop for the positive abutments and a one-way stop for the one-way abutments, said positive stop and abutments constituting means for locking said movable member in selected positions along its path, both stops being movably mounted on said movable member and having a connection therebetween whereby release of one causes engagement of the other preventing continuous movement of said movable member in one direction, and said one-way stop permitting continuous movement in the opposite direction, the connection carrying the positive stop into the spaces between the positive abutments as the one-way stop rides over the one-way abutments, when said locking means is released.

In testimony whereof I hereunto affix my signature.

JOHN A. McGREW.